US00RE46609E

(19) United States
(12) Reissued Patent
Kawase

(10) Patent Number: US RE46,609 E
(45) **Date of Reissued Patent: *Nov. 14, 2017**

(54) BACKLIGHT DEVICE AND LIQUID CRYSTAL DISPLAY APPARATUS

(71) Applicant: Saturn Licensing LLC, New York, NY (US)

(72) Inventor: Mitsuhiro Kawase, Kanagawa (JP)

(73) Assignee: SATURN LICENSING LLC., New York, NY (US)

( * ) Notice: This patent is subject to a terminal disclaimer.

(21) Appl. No.: 13/771,796

(22) Filed: Feb. 20, 2013

Related U.S. Patent Documents

Reissue of:
(64) Patent No.: 7,894,015
Issued: Feb. 22, 2011
Appl. No.: 12/270,949
Filed: Nov. 14, 2008

(30) Foreign Application Priority Data

Nov. 22, 2007 (JP) ..... 2007-303605

(51) Int. Cl.
*G09F 13/04* (2006.01)
*G02F 1/1335* (2006.01)
*G02F 1/1333* (2006.01)

(52) U.S. Cl.
CPC .. *G02F 1/133605* (2013.01); *G02F 1/133603* (2013.01); *G02F 1/133608* (2013.01);
(Continued)

(58) Field of Classification Search
CPC ... G02F 2001/133388; G02F 1/133605; G02F 1/133608; G02F 1/133602; G02F 1/133382
(Continued)

(56) References Cited

U.S. PATENT DOCUMENTS 6,128,053 A * 10/2000 Brandt ..... G02F 1/133382 349/147
6,163,359 A * 12/2000 Smith ..... G02F 1/133602 349/150
(Continued)

FOREIGN PATENT DOCUMENTS

JP 2005-352427 12/2005
JP 2006-054486 3/2006
(Continued)

*Primary Examiner* — Deandra Hughes
(74) *Attorney, Agent, or Firm* — Dentons US LLP

(57) ABSTRACT

A backlight device that illuminates a transmissive liquid crystal panel is disclosed. The device includes: a plurality of light source substrates on which a plurality of light emitting devices irradiating illumination light are mounted; a bottom chassis having one surface to which the plurality of light source substrates are attached; a reflector having openings corresponding to the light emitting devices and through which the light emitting devices are exposed to one surface side, and reflecting the illumination light irradiated from the light emitting devices; a diffuser facing the one surface side of the reflector through a predetermined facing interval and internally diffusing the illumination light incident from the reflector; and an optical function sheet laminate combined with the diffuser on one surface side thereof, containing a stack of a plurality of optical function sheets and guiding the illumination light to the transmissive liquid crystal panel.

20 Claims, 10 Drawing Sheets

(52) U.S. Cl.
CPC ..... *G02F 2001/133322* (2013.01); *G02F 2001/133612* (2013.01); *G02F 2201/46* (2013.01); *G02F 2202/28* (2013.01)

(58) Field of Classification Search
USPC ..... 349/56, 58, 61, 64, 104, 105, 106, 112, 349/113, 158; 362/97.2, 97.3
See application file for complete search history.

(56) References Cited

U.S. PATENT DOCUMENTS 6,747,726 B1 * 6/2004 Birke ..... G02F 1/133382 349/113
6,870,525 B2 * 3/2005 Kawabata et al. ..... G02F 1/133605 345/102
7,273,310 B2 * 9/2007 Chen ..... F21V 29/004 362/218
7,446,827 B2 * 11/2008 Ko ..... G02F 1/133606 349/64
7,452,109 B2 * 11/2008 Noh ..... G02B 6/0068 362/294
7,709,855 B2 * 5/2010 Ooya et al. ..... 257/99
7,710,531 B2 * 5/2010 Kurokawa ..... G02F 1/133308 349/149
8,021,015 B2 * 9/2011 Yokota ..... F21V 19/008 362/220
8,854,284 B2 * 10/2014 Houdek ..... G02F 1/133603 315/32
2002/0113919 A1 * 8/2002 Liu ..... G02F 1/133382 349/65
2004/0218388 A1 * 11/2004 Suzuki ..... G02F 1/133603 362/231
2005/0259424 A1 * 11/2005 Zampini et al. ..... 362/294
2006/0082700 A1 * 4/2006 Gehlsen ..... G02B 5/0242 349/64
2006/0092666 A1 * 5/2006 Jeong ..... G02F 1/133603 362/613
2006/0186425 A1 * 8/2006 Yano ..... F21K 9/00 257/98
2006/0279671 A1 * 12/2006 Han ..... G02F 1/133603 349/61
2007/0070625 A1 * 3/2007 Bang ..... G02F 1/133603 362/240
2007/0103908 A1 * 5/2007 Tabito ..... G02F 1/133608 362/294
2007/0153548 A1 * 7/2007 Hamada ..... G02B 6/0036 362/615
2007/0211205 A1 * 9/2007 Shibata ..... G02F 1/133603 349/161
2007/0221943 A1 * 9/2007 Moriya et al. ..... 257/99
2007/0236626 A1 * 10/2007 Koganezawa ..... 349/61
2008/0019134 A1 * 1/2008 Mukai ..... F21K 9/00 362/294
2008/0036940 A1 * 2/2008 Song ..... G02F 1/133608 349/61
2008/0088769 A1 * 4/2008 Kim et al. ..... 349/61
2008/0089054 A1 * 4/2008 Chang ..... 362/97
2008/0100790 A1 * 5/2008 Kang ..... G02F 1/133603 349/161
2008/0117356 A1 * 5/2008 Oku ..... G02F 1/133603 349/62
2008/0144315 A1 * 6/2008 Chen ..... G02F 1/133603 362/249.01
2008/0304259 A1 * 12/2008 Teng ..... G02F 1/133603 362/225
2009/0046446 A1 * 2/2009 Kamada et al. ..... 362/97.3
2009/0051293 A1 * 2/2009 Houdek ..... G02F 1/133603 315/32
2009/0091920 A1 * 4/2009 Naijo ..... G02F 1/133603 362/97.3
2009/0097233 A1 * 4/2009 Ooya et al. ..... H01L 33/62 362/97.3
2009/0135331 A1 * 5/2009 Kawase ..... 349/58
2009/0174840 A1 * 7/2009 Lee ..... H05K 1/142 349/67
2009/0213575 A1 * 8/2009 Blumel et al. ..... 362/97.3

FOREIGN PATENT DOCUMENTS

JP 2006-058486 3/2006
JP 2006-309981 11/2006
WO WO 2007037047 A1 * 4/2007
WO WO 2007076818 A1 * 7/2007

* cited by examiner

BACKLIGHT DEVICE AND LIQUID CRYSTAL DISPLAY APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCES TO RELATED APPLICATIONS

*More than one reissue application has been filed for the reissue of U.S. Pat. No. 7,894,015. The other reissue application is U.S. application Ser. No. 15/000,746, filed Feb. 20, 2013. The U.S. application Ser. No. 15/000,746 is a reissue continuation application of the present application.* The present invention contains subject matter related to *and claims the benefit of priority to* Japanese Patent Application JP 2007-303605 filed in the Japanese Patent Office on Nov. 22, 2007, the entire contents of which being incorporated herein by reference.

BACKGROUND OF THE INVENTION

1. Field of the Invention

The present invention relates to a backlight device that illuminates a transmissive liquid crystal panel and a liquid crystal display apparatus including the backlight device.

2. Description of the Related Art

A liquid crystal display apparatus has liquid crystal filled between two transparent substrates. The application of voltage thereto changes the direction of liquid crystal molecules and thus changes the optical transmittance, whereby the liquid crystal display apparatus can optically display a predetermined picture. Since liquid crystal itself does not contain a light emitter, some liquid crystal display apparatus may include a backlight device that [irradiates] *radiates* illumination light by using a light emitting diode (or LED) as a light source to the back side of a liquid crystal panel, for example (refer to JP-A-2006-058486 (Patent Document 1)). The backlight device connects to a plurality of light source substrates having a plurality of LEDs through wiring members such as harnesses and is attached to a bottom chassis, for example, with a double-faced adhesive tape, for example.

However, in the backlight device, if the light source substrates are warped, if the light source substrates and the bottom chassis contain different materials with different thermal expansion coefficients and therefore with different degrees of thermal expansion or if the bottom chassis has projections and depressions, for example, it is difficult to keep the intimate contact between the light source substrates and the bottom chassis during operations, which lifts the light source substrates off the bottom chassis and produces a gap between the light source substrates and the bottom chassis.

SUMMARY OF THE INVENTION

In the backlight device, an air layer within the gap if any produced between the light source substrates and the bottom chassis functions as a heat insulating layer, which prevents the radiation of heat generated from LEDs mounted on the area having the gap to the outside through the bottom chassis and only increases the temperature of the LEDs mounted on the area. The increase in temperature of the LEDs decreases the luminous efficiency of the LED, which may possibly cause problems of variations in brightness and color.

Thus, it is desirable to provide a backlight device which allows the radiation of the heat generated from LEDs to the outside efficiently and a liquid crystal display apparatus including the backlight device.

According to an embodiment of the invention, there is provided a backlight device that illuminates a transmissive liquid crystal panel from the back side, the backlight device including a plurality of light source substrates on which a plurality of light emitting devices that [irradiate] *radiate* illumination light are mounted, a bottom chassis having one surface to which the plurality of light source substrates are attached, a reflector having openings corresponding to the light emitting devices mounted on the light source substrates attached to the bottom chassis, the light emitting devices being exposed to one surface side through the openings, the reflector reflecting the illumination light [irradiated] *radiated* from the light emitting devices, a diffuser facing the one surface side of the reflector through a predetermined facing interval from the reflector and internally diffusing the illumination light incident from the reflector, and an optical function sheet laminate combined with the diffuser on one surface side thereof, containing a stack of a plurality of optical function sheets and guiding the illumination light to the transmissive liquid crystal panel, wherein the reflector is directly attached to the one surface of the bottom chassis, and the light source substrates are pushed against the bottom chassis.

According to another embodiment of the invention, there is provided a liquid crystal display apparatus including a transmissive liquid crystal panel and a backlight device that illuminates the transmissive liquid crystal panel from the back side.

According to the embodiments of the invention, the push of light source substrates, which are attached to the bottom chassis, against a bottom chassis through a reflector can keep the light source substrates in intimate contact with the bottom chassis without the formation of any gaps between the light source substrates and the bottom chassis. Thus, the heat generated from LEDs can be radiated to the bottom chassis efficiently. Therefore, according to the embodiments of the invention, the decrease in luminous efficiency of a part of the LEDs due to the increase in temperature of the partial LEDs can be prevented, and the occurrence of variations in brightness and color can be prevented.

DESCRIPTION OF THE PREFERRED EMBODIMENTS

With reference to drawings, a backlight device and a liquid crystal display apparatus to which the invention is applied will be described.

Figure 1:
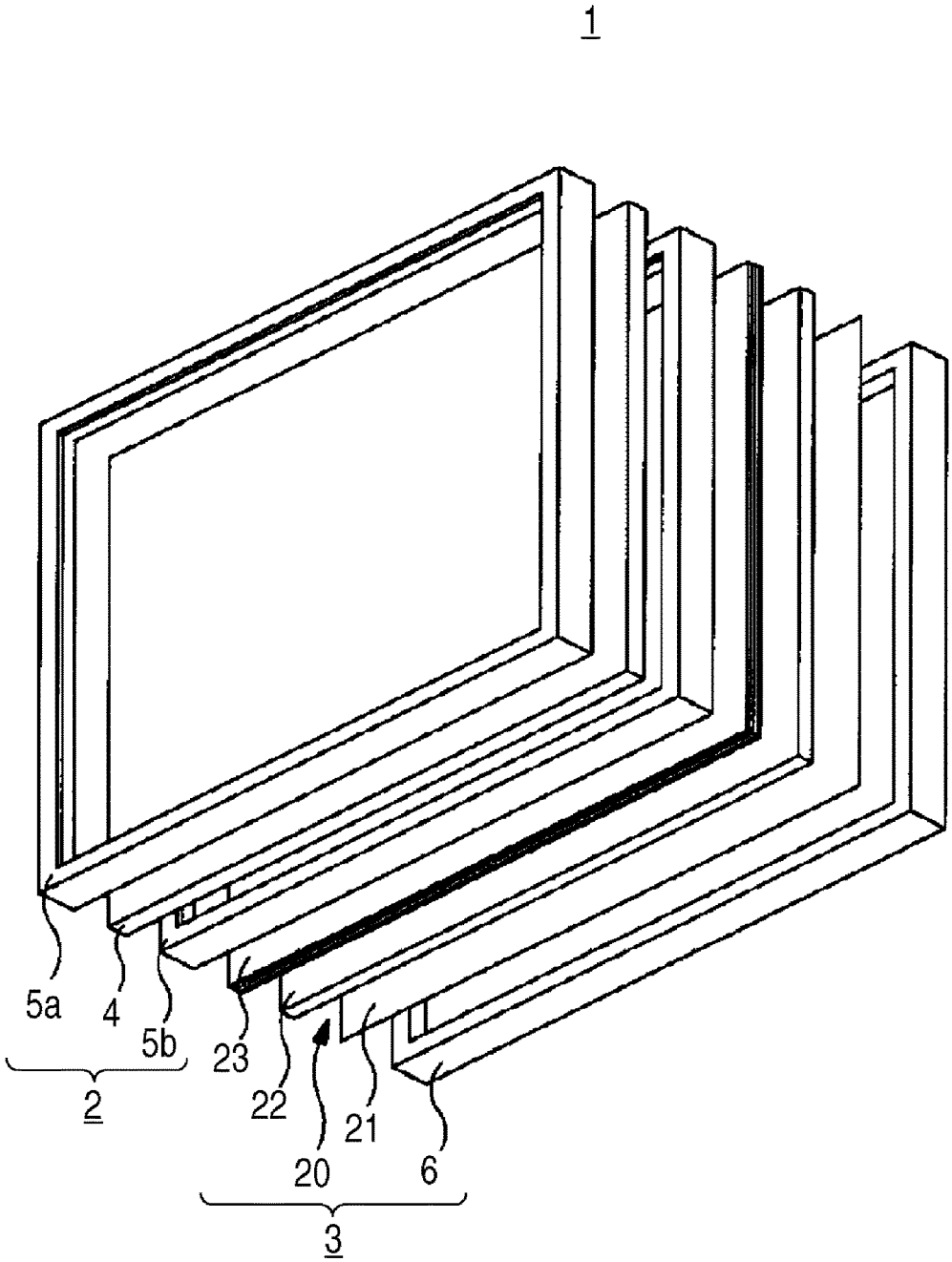
FIG. 1 is an exploded perspective view of an essential part of a transmissive liquid crystal display apparatus to which the invention is applied.
Figure 2:
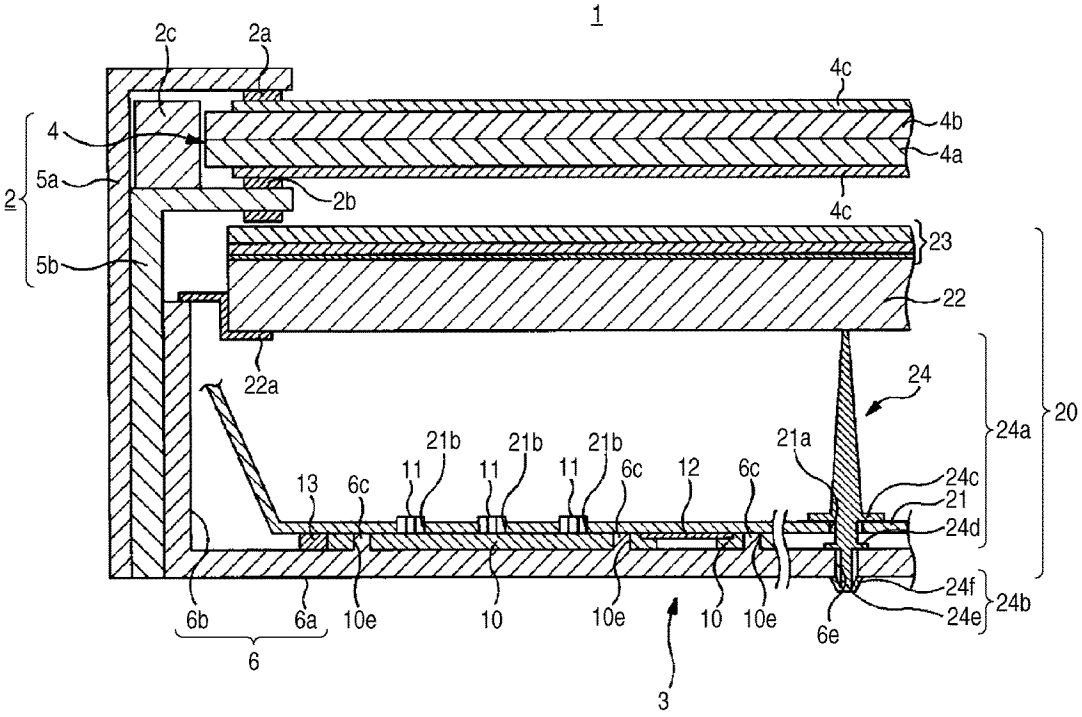
FIG. 2 is a longitudinal section view of an essential part of a transmissive liquid crystal display apparatus to which the invention is applied.

A liquid crystal display apparatus 1 to which the invention is applied may be used as a display panel for a television receiver having a large display screen. The liquid crystal display apparatus 1 includes, as shown in FIGS. 1 and 2, a liquid crystal panel unit 2 having a transmissive liquid crystal panel 4, and a backlight unit 3 to which the invention is applied. The backlight unit 3 is combined with the liquid crystal panel unit 2 the back side thereof and [irradiates] *radiates* illumination light to the liquid crystal panel unit 2.

The liquid crystal panel unit 2 to which the backlight unit 3 [irradiates] *radiates* illumination light from the back side has a substantially rectangular liquid crystal panel 4 and a front frame member 5a and back frame member 5b, both of which hold the liquid crystal panel 4.

The liquid crystal panel 4 held by the front frame member 5a and back frame member 5b has liquid crystal, not shown, between a first glass substrate 4a and a second glass substrate 4b spaced apart through a facing interval produced by spacer beads, for example, as shown in FIG. 2. The inner surface of the first glass substrate 4a may have a transparent electrode in a stripe pattern, an insulating film and an alignment film in which liquid crystal molecules are aligned in a certain direction, for example. The inner surface of the second glass substrate 4b may have a color filter for optical three primary colors, an overcoat layer that protects the color filter, a transparent electrode in a stripe pattern, and an alignment film in which liquid crystal molecules are aligned in a certain direction. Furthermore, the surfaces of the first glass substrate 4a and second glass substrate 4b have optical film layers 4c one containing a polarizing film and the other containing a retardation film.

The liquid crystal panel 4 having the configuration above has liquid crystal filled between the first glass substrate 4a and second glass substrate 4b with a facing interval held therebetween by spacer beads, for example. The application of voltage to the transparent electrode causes the alignment film containing polyimide to align the liquid crystal molecules in the horizontal direction about the interface, and the change in direction of the liquid crystal molecules changes their optical transmittance. Then, on the liquid crystal panel 4, the wavelength characteristic of illumination light [irradiated] *radiated* by the backlight unit 3 is achromatized or changed to that of white through the optical film layers 4c and is changed to that of full-color through a color filter. Thus, a predetermined picture, for example, is displayed in full-color. The liquid crystal panel 4 is not limited to the configuration above.

The front frame member 5a and back frame member 5b holding the liquid crystal panel 4 have a frame shape and sandwich the outer circumferential edge of the liquid crystal panel 4 through spacers 2a and 2b and a guide member 2c to hold the liquid crystal panel 4, as shown in FIG. 2.

The liquid crystal panel unit 2 having the configuration above is combined with the backlight unit 3 at the back, and the [irradiation] *radiation* of illumination light to the liquid crystal panel unit 2 causes the color-display of a predetermined picture, for example. The liquid crystal display apparatus 1 to which the invention is applied includes the backlight unit 3 to which the invention is applied, which will be described next, at the back, whereby the backlight unit 3 can [irradiate] *radiate* illumination light all over the liquid crystal panel unit 2 in an even and stable manner. Therefore, the variations in brightness and color can be reduced, and the image quality can be improved.

The backlight unit 3, which is combined with the liquid crystal panel unit 2 on the back thereof and [irradiates] *radiates* illumination light thereto, has a substantially equal external dimension as that of the back of the liquid crystal panel 2, as shown in FIG. 2, and has a bottom chassis 6 to be combined with the back frame member 5b, for example, a plurality of light source substrates 10, which are directly mounted to one surface of the bottom chassis 6 and [irradiate] *radiate* illumination light by using a plurality of light emitting diodes (each of which will be called LED below) 11 mounted thereon as light sources, and an optical sheet block 20, which is mounted to one surface side of the bottom chassis 6 through a predetermined facing interval against the bottom chassis 6 and performs optical processing on the illumination light [irradiated] *radiated* from the light source substrates 10.

The bottom chassis 6, to which the light source substrates 10 are mounted, is formed by galvanizing a magnetically attractable metallic material having mechanical rigidity and includes, as shown in FIG. 2, a main surface part 6a having a substantially rectangular thin plate shape, which is slightly larger than the external shape of the liquid crystal panel 4, and an outer circumferential wall part 6b to be combined with the back frame member 5b at the outer circumference around the main surface part 6a.

The main surface part 6a has, as will be described later, a positioning projection 6c that positions a corresponding light source substrate 10 at a predetermined position on the one surface and an insertion hole 6e through which an optical stud member 24 is inserted, which will be described later. The main surface part 6a further includes LED drive circuit substrates 15a and 15b to which the light source substrates 10 are electrically connected, a double-faced adhesive tape 13 that bonds a reflector 21, which will be described later, to the bottom chassis 6, and a magnet attachment part, not shown, to which magnets 14, which will be described alter, are attached. The outer circumferential edge part of the reflector 21 bonded to the one surface with the double-faced tape 13 is attached to the outer circumferential wall part 6b.

Figure 3:
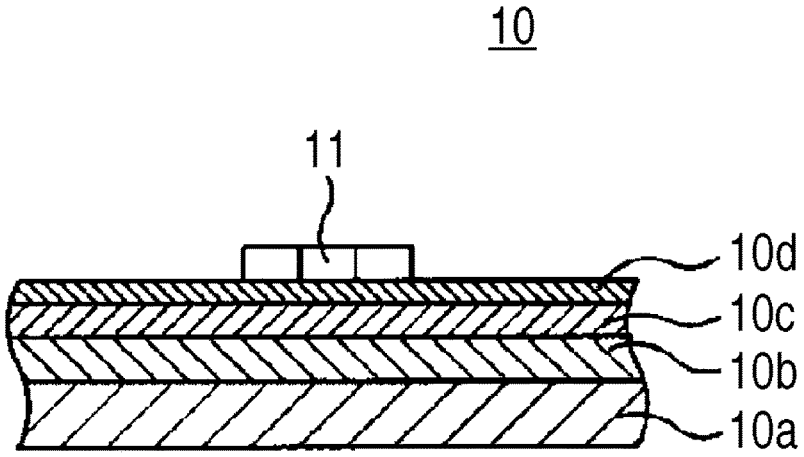
FIG. 3 is a longitudinal section view of an essential part of a light source substrate.
Figure 4:
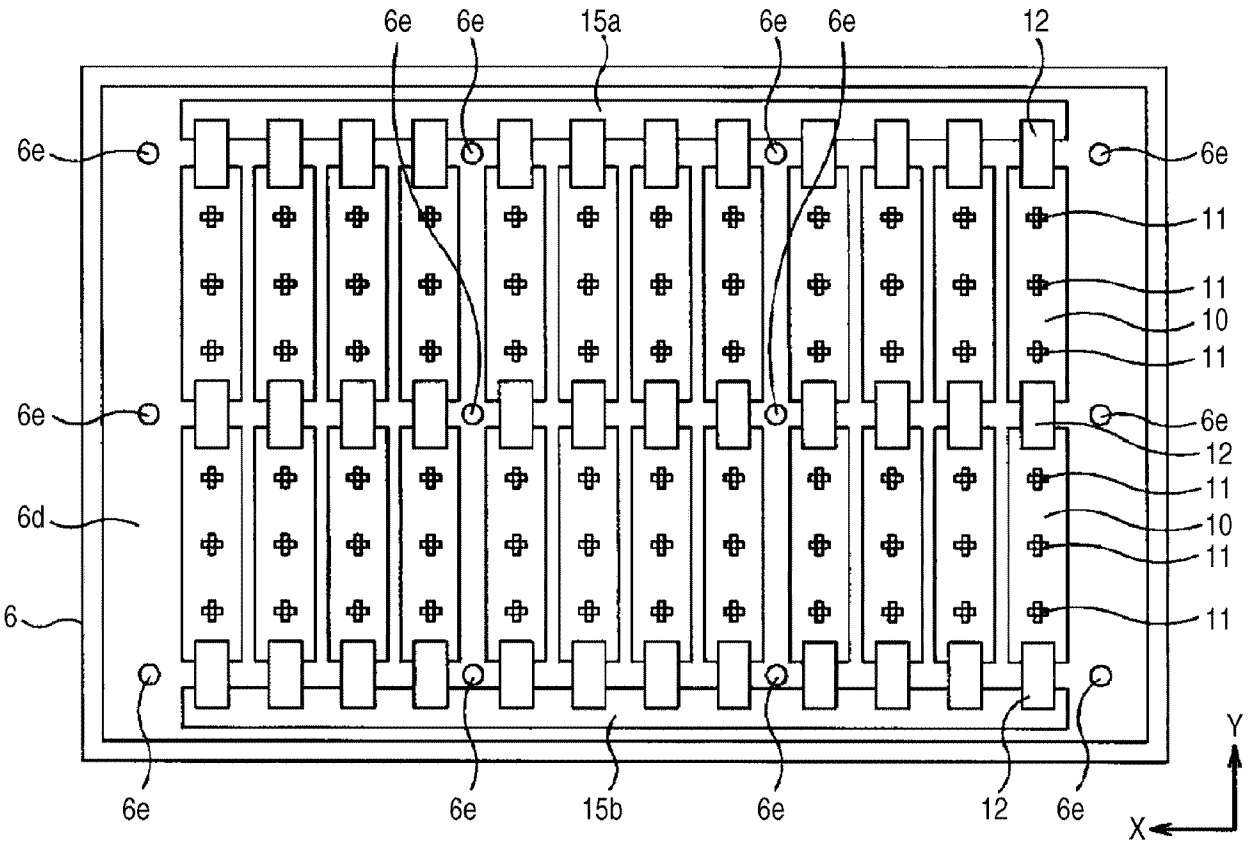
FIG. 4 is a plan view of a bottom chassis to which the light source substrates are directly mounted.

The plurality of light source substrates 10 on which the plurality of LEDs 11 that [irradiate] *radiate* illumination light are mounted have an electrically conductive layer, as shown in FIGS. 3 and 4, on the surface and are metal core substrates having flexibility and thermal conductivity, which are formed of an aluminum material, for example, and have a substantially rectangular thin plate shape. More specifically, as shown in FIG. 3, each of the light source substrates 10 has an insulating layer 10b approximately 0.15 mm thick on a surface of a base 10a approximately 0.2 mm thick of aluminum foil. An electrically conductive layer 10c having a wiring pattern of copper foil is provided on the surface of the insulating layer lob. The electrically conductive layer 10c has a land on which a corresponding LED 11 is mounted and a light-source wiring part to which a wiring member is connected. A soldering resist layer 10d covers the wiring pattern on the surface of the electrically conductive layer 10c and protects the wiring pattern. Each of the light source substrates 10 has a thickness of approximately 0.5 mm as a whole.

Each of the light source substrates 10 having the configuration above is a metal core substrate of an aluminum material, for example, and is as thin as approximately 0.5 mm thick as a whole including a thickness of the base 10a of approximately 0.2 mm. Therefore, the light source substrate 10 has high flexibility and can be bent for intimate contact with the bottom chassis 6 in accordance with the form of the bottom chassis 6 even in a case where the one surface of the bottom chassis 6 has projections and depressions. As a result, the heat from the light source substrates 10 can be radiated to the bottom chassis 6 efficiently.

A plurality of LEDs 11 each including a combination of a total of four LEDs of one red LED, one blue LED and two green LEDs are mounted on the lands of the electrically conductive layer 10c at substantially equal intervals in the direction of the long side of each of the light source substrates 10. More specifically, three LEDs 11 are mounted on the light source substrate 10 at substantially equal intervals in the direction of the long side. Notably, it is important that the light source substrates 10 have flexibility because of the thin light source substrates 10 as a whole each including the thin base 10a. The thicknesses of the base 10a, insulating layer 10b, electrically conductive layer 10c and soldering resist layer 10d are not limited to those described above and can be changed properly. Each of the LEDs 11 may include a combination of a total of three LEDs of a red LED, a blue LED and a green LED. Furthermore, the number and alignment positions of the LEDs 11 to be mounted on the light source substrate 10 may differ in accordance with the size of the liquid crystal panel 4, for example, and can be changed properly.

Figure 5:
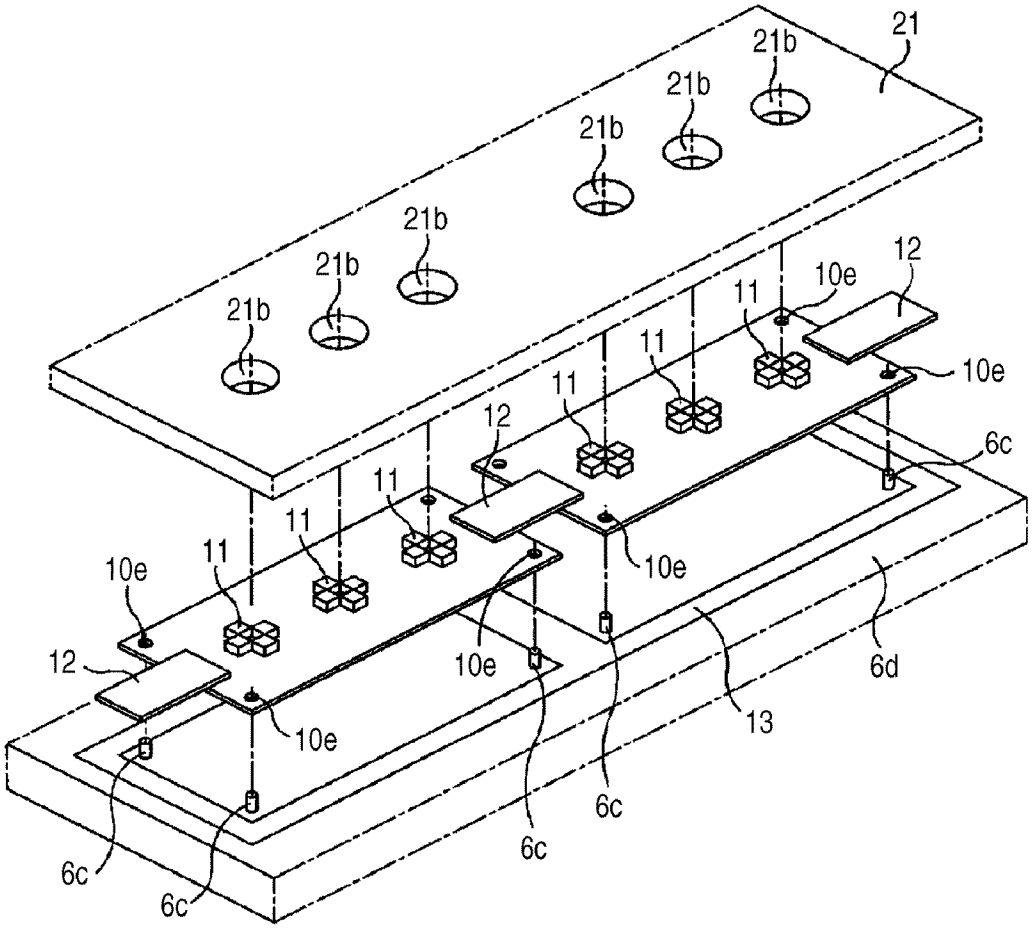
FIG. 5 is an exploded perspective view of an essential part of the bottom chassis to which the light source substrates are directly mounted.

In addition, the light source substrate 10 has positioning holes 10e for positioning the bottom chassis 6, as shown in FIG. 5. The positioning holes 10e correspond to the alignment positions of positioning projections 6c on one surface of the bottom chassis 6 and may be at the vicinities of the four corners. The positioning projections 6c of the bottom chassis 6 are inserted through the positioning holes 10e, whereby the light source substrate 10 can be positioned and aligned on the one surface of the bottom chassis 6. It is important that the positioning holes 10e can position the light source substrates 10 on the one surface of the bottom chassis 6, and the number and alignment positions of the positioning holes 10e can be changed properly. For example, the light source substrate 10 may have the positioning holes 10e at two diagonal corners.

The light source substrates 10 are positioned directly onto one surface the bottom chassis 6, as shown in FIG. 4, with the long sides in the longitudinal direction, that is, the arrow-Y direction in FIG. 4, which is orthogonal to the long side of the bottom chassis 6, and in a matrix of 2 rows by 12 columns. The light source substrates 10 may be directly aligned on the bottom chassis 6 with the long sides faced in the horizontal direction, that is, the arrow-X direction in FIG. 4.

Figure 6:
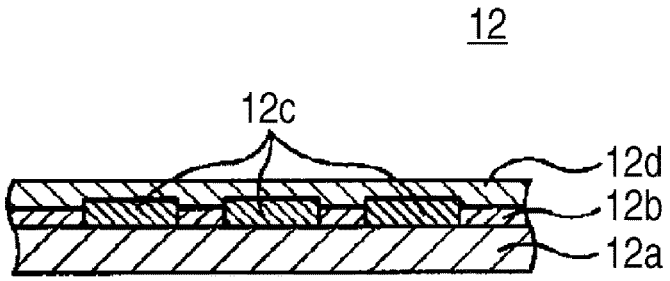
FIG. 6 is a longitudinal section view of an essential part of a wiring substrate.

The light source substrates 10 and 10 aligned in the longitudinal direction are connected electrically through a wiring substrate 12, as shown in FIG. 5. The wiring substrate 12 has an electrically conductive layer on the surface and is a metal-core substrate with flexibility and thermal conductivity containing an aluminum material. The wiring substrate 12 is a substantially rectangular and thin plate shape. More specifically, as shown in FIG. 6, the wiring substrate 12 has an insulating layer 12b approximately 0.15 mm thick on the surface of a base 12a approximately 0.2 mm thick of aluminum foil. An electrically conductive layer 12c of copper foil is provided on the surface of the insulating layer 12b. The electrically conductive layer 12c has a wiring pattern having a wiring connection part to be connected to a light source connection part of the light source substrate 10. A soldering resist layer 12d is provided on the surface of the electrically conductive layer 12c. The soldering resist layer 12d covers the wiring pattern to protect the wiring pattern. The soldering resist layer 12d has a thickness of approximately 0.5 mm as a whole.

The longitudinally aligned light source substrates 10 and 10 are electrically connected through the wiring substrate 12, as shown in FIGS. 4 and 5, by facing the soldering resist layer 12d against the soldering resist layers 10d of the light source substrates 10 and connecting the wiring connection part to the light source connection parts of the light source substrates 10 by soldering or ACF (or Anisotropic Conductive Film) connection, for example. The wiring substrate 12 electrically connects one light source substrate 10 of the longitudinally aligned light source substrates 10 and 10 to one LED drive circuit substrate 15a on the bottom chassis 6 and the other light source substrate 10 to the other LED drive circuit substrate 15b on the bottom chassis 6. The wiring connection part may be electrically connected to the light source connection part of each of the light source substrates 10 by soldering or ACF connection, for example, with the soldering resist layer 12d faced in the same direction as that of the soldering resist layer 10d of the light source substrate 10.

The wiring substrate 12 having the configuration above is a metal core substrate containing an aluminum material, for example, and is as thin as approximately 0.5 mm thick as a whole including a thickness of the base 12a of approximately 0.2 mm. Therefore, the wiring substrate 12 has high flexibility and can easily connect the light source substrates 10 and 10 electrically. Furthermore, the heat conducted from the LEDs 11 can be radiated to the bottom chassis 6 efficiently. Since the wiring substrate 12 is a metal core substrate, the discharge of the unnecessary radiation of current can be suppressed, and the electromagnetic wave resistant characteristics can be improved. Notably, it is important that the wiring substrate 12 has high flexibility and thermal conductivity because of the thin wiring substrate 12 as a whole including the thin base 12a. The thicknesses of the base 12a, insulating layer 12b, electrically conductive layer 12c and soldering resist layer 12d are not limited to those described above and can be changed properly.

The bottom chassis 6 having the plurality of light source substrate 10 on one surface has a plurality of insertion holes 6e in an area where the light source substrates 10 are not placed (which will be called alignment part 6d hereinafter), as shown in FIG. 4. Optical stud members 24, which will be described later, stand through the insertion holes 6e. More specifically, a total of 12 insertion holes 6e for the optical stud members 24 are placed in the alignment part 6d of the bottom chassis 6, including three at predetermined intervals in the longitudinal direction, that is, the arrow-Y direction in FIG. 4, and four at predetermined intervals in the horizontal direction, that is, the arrow-X direction in FIG. 4. The number and alignment positions of the insertion holes 6e may differ in accordance with the size of the liquid crystal panel 4, for example, and can be changed properly.

An optical sheet block 20 to be attached to the bottom chassis 6 is faced against the back side of the liquid crystal panel 4, as shown in FIG. 2. The optical sheet block 20 has a reflector 21, a diffuser 22, an optical function sheet laminate 23 and the optical stud member 24. The reflector 21 [is faced against] *has a bottom surface facing* the bottom chassis 6 having one surface on which a plurality of light source substrates 10 are mounted through a predetermined facing interval [against the one surface] and reflects illumination light [irradiated] *radiated* from the LEDs 11 toward the [one surface] *liquid crystal display*. The diffuser 22 [is faced against] *faces* one surface side of the reflector 21 through a predetermined facing interval and internally diffuses the incident illumination light. The optical function sheet laminate 23 is combined with the diffuser 22 on the one surface side thereof and includes a stack of a plurality of optical function sheets. The optical stud member 24 defines the facing interval between the bottom chassis 6 and the reflector 21 and the facing interval between the reflector 21 and the diffuser 22.

The reflector 21 *with the bottom surface* facing the one surface of the bottom chassis 6 through a predetermined facing interval is formed into a substantially rectangular and thin plate, as shown in FIG. 2, by a transparent or milky-white resin having a high reflectivity and mechanical rigidity, such as a polycarbonate resin and in a substantially equal size as that of the main surface part 6a of the bottom chassis 6. [The] *One* surface *of the reflector* is coated with a reflective film. The reflector 21 has reflector through holes 21a corresponding to the alignment positions of the insertion holes 6e of the bottom chassis 6 to which the optical stud members 24 are inserted. More specifically, the reflector 21 has a total of 12 reflector through holes 21a including three at predetermined intervals in the longitudinal direction by four at predetermined intervals in the horizontal direction, which correspond to the alignment positions of the insertion holes 6e.

Furthermore, the reflector 21 has openings 21b facing the LEDs 11 mounted on the plurality of light source substrates 10 on one surface of the bottom chassis 6, and the LEDs 11 are exposed through the openings 21b. The reflector 21 reflects the illumination light [irradiated] *radiated* by the LEDs 11 exposed through the openings 21b to one surface side, that is, the diffuser 22 side.

Figure 7:
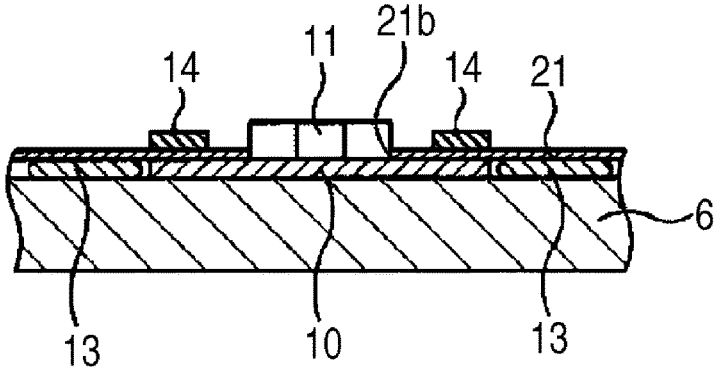
FIG. 7 is a longitudinal section view of an essential part showing a state that the light source substrates are pushed against the bottom chassis through a reflector by using a double-faced adhesive tape and magnets.

As shown in FIGS. 2 and 7, the reflector 21 having the configuration above is adhered to the one surface of the bottom chassis 6 through the light source substrates 10 with the double-faced adhesive tape 13 on the alignment part 6d of the bottom chassis 6 and is mounted on the one surface of the bottom chassis 6 with the magnets 14, which is a pushing member placed on one surface of the reflector 21.

The double-faced adhesive tape 13 that adheres the reflector 21 to one surface of the bottom chassis 6 is a thermal conductive adhesive tape with high thermal conductivity and is provided all around the light source substrates 10 on the alignment part 6d, as shown in FIG. 5.

Figure 8:
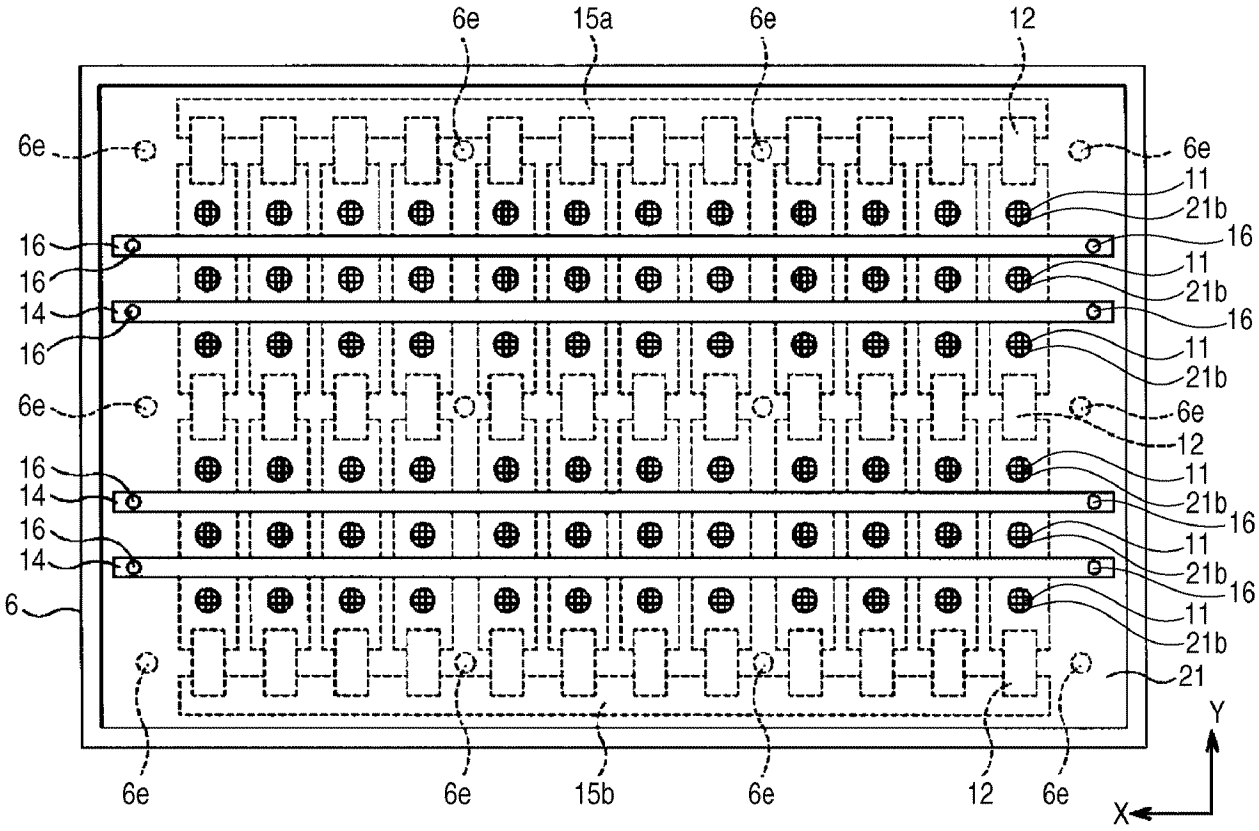
FIG. 8 is a plan view showing a state that the light source substrates are pushed against the bottom chassis through the reflector by using the double-faced adhesive tape and the magnets.

As shown in FIG. 8, each of the magnets 14 that attach the reflector 21 to one surface of the bottom chassis 6 is a plate-shaped magnet having a substantially equal length to that of the long side of the main surface part 6a of the bottom chassis 6. A plurality of magnets 14 are placed over all of the light source substrate 10, which are aligned in the horizontal direction on one surface of the reflector 21 in the horizontal direction, that is, in the arrow-X direction in FIG. 8, which is orthogonal to the long side of the light source substrates 10. More specifically, since three LEDs 11 are mounted on each of the light source substrates 10, a total of four magnets 14 are placed on one surface of the reflector 21 as a whole, including a total of two among the LEDs 11 and 11 in the horizontal direction over the 12 light source substrates 10, which are aligned in the horizontal direction. The magnets 14 are bonded to magnet attachment parts, not shown, of the bottom chassis 6 through connecting member attachment holes, not shown, of the reflector 21 with connecting members 16 such as a screw. The number and alignment positions of the magnets 14 may differ in accordance with the size of the liquid crystal panel 4 and/or the light source substrates 10, for example, and can be changed properly.

The attachment of the reflector 21 to the alignment part 6d of the bottom chassis 6 through the light source substrates 10 with the double-faced adhesive tape 13 pushes the light source substrates 10 against the bottom chassis 6. Furthermore, the magnets 14 placed on one surface of the reflector 21 magnetically attract the bottom chassis 6 formed by galvanizing a magnetically attractable metallic material, which pushes the light source substrates 10 against the bottom chassis 6.

Thus, the reflector 21 bends the light source substrates 10, which are thin for high flexibility, in accordance with the form of the bottom chassis 6 and brings them into intimate contact with the one surface of the bottom chassis 6. Thus, the formation of a gap between the light source substrates 10 and the bottom chassis 6 can be prevented. The reflector 21 attached to the one surface of the bottom chassis 6 with the double-faced adhesive tape 13 and magnets 14 has the outer circumferential edge attached to the outer circumferential wall part 6b of the bottom chassis 6 with a connecting member such as a screw or an adhesive material, for example. The reflector 21 is not limited to one formed by a resin material, for example. It is important here that the reflector 21 reflects illumination light, and the reflector 21 may be one formed by coating a reflective film over a surface of a metallic material having mechanical rigidity such as an aluminum material.

The diffuser 22 facing one surface of the reflector 21 through a predetermined facing interval against the reflector 21 is formed into a substantially rectangular and thin plate, as shown in FIG. 2, by a transparent or milky-white resin having conductivity and mechanical rigidity, such as an acrylic resin and a polycarbonate resin and in a substantially same shape as that of the reflector 21. The diffuser 22 internally refracts and reflects illumination light incident from the other surface side for diffusion, whereby the illumination light is guided to the optical functional sheet laminate 23 combined with the one surface evenly and all over the surface. The diffuser 22 is attached to the outer circumferential wall part 6b of the bottom chassis 6 with the outer circumferential edge held by a bracket member 22a.

The optical function sheet laminate 23 combined with the diffuser 22 on one surface thereof has a substantially rectangular shape, which is substantially equal shape to the diffuser 22, as shown in FIG. 2, and has a stack of a plurality of optical function sheets having optical functions. The plurality of optical function sheets may include a polarizing film having a function of decomposing illumination light [irradiated] *radiated* from the LEDs 11 mounted on the light source substrates 10 to the liquid crystal panel 4 into orthogonal polarized components, a retardation film having a function of compensating phase shifts among optical waves for wider viewing angles and prevention of coloration and a diffusion film having a function of diffusing illumination light. The optical function sheet laminate 23 is not limited to the optical function sheet described above but may be upper and lower two diffusion sheets sandwiching a brightness enhancement film for brightness enhancement, a retardation film and/or a prism sheet, for example.

Each of the optical stud members 24 that define the mutual facing intervals among the optical sheets as described above is formed by a transparent or milky-white resin having a high reflectivity, conductivity and mechanical rigidity, such as a polycarbonate resin, as shown in FIG. 2. Each of the optical stud members 24 has a body 24a and an attachment part 24b. The body 24a has the pointed end abutted against the other surface of the diffuser 22 and defines the facing interval between the diffuser 22 and the bottom chassis 6. The attachment part 24b is provided continuously toward the base end of the body 24a.

The body 24a defining the facing interval between the diffuser 22 and the bottom chassis 6 has a conical pointed end with the diameter gradually decreasing toward the tip, and a reflector defining part 24c projects from the base end of the conical shape. The reflector defining part 24c has a larger diameter than that of the reflector through hole 21a. The reflector defining part 24c is abutted against one surface of the reflector 21. Furthermore, in the body 24a, a bottom chassis defining part 24d projects from the base end. The bottom chassis defining part 24d has a larger diameter than that of the insertion hole 6e of the bottom chassis 6. The bottom chassis defining part 24d is abutted against one surface of the bottom chassis 6.

The attachment part 24b provided continuously at the base end of the body 24a has a spindle 24e to be inserted to the insertion hole 6e of the bottom chassis 6. A support medium 24f projects from the outer circumference of the base end of the spindle 24e. The support medium 24f has a larger diameter than that of the insertion hole 6e at the tip end, and the tip surface is supported by the circumference on the other surface side of the insertion hole 6e. The support medium 24f has an elastic characteristic, and when the tip end of a larger diameter than that of the insertion hole 6e is pushed radially, the diameter becomes smaller than that of the insertion hole 6e temporarily. Thus, the support medium 24f can be detached from the bottom chassis 6.

Now, a method for assembling the backlight unit 3 will be described.

The light source substrate 10 having three LEDs 11, which includes a combination of a total of four of one red LED, one blue LED and two green LEDs, at predetermined intervals in the long side direction on the land holds, the positioning projection 6c of the bottom chassis 6 through the positioning hole 10e and is positioned on one surface of the bottom chassis 6. As a result, the light source substrates 10 are provided thereon in a matrix of 2 rows by 12 columns. The longitudinally aligned light source substrates 10 and 10 are electrically connected through the wiring substrate 12, as shown in FIGS. 4 and 5, by facing the soldering resist layer 12d against the soldering resist layers 10d of the light source substrates 10 and connecting the wiring connection part to the light source connection parts of the light source substrates 10 by soldering or ACF (or Anisotropic Conductive Film) connection, for example. The wiring substrate 12 electrically connects one light source substrate 10 of the longitudinally aligned light source substrates 10 and 10 to one LED drive circuit substrate 15a on the bottom chassis 6 and the other light source substrate 10 to the other LED drive circuit substrate 15b on the bottom chassis 6. The double-faced adhesive tape 13 that adheres thereto the reflector 21 is provided across all circumferences of the light source substrates 10 on the alignment part 6d, which is an area where the light source substrates 10, which are placed on one surface of the bottom chassis 6, are not placed.

Next, the reflector 21 has the openings 21b through which the LEDs 11 are exposed and has the other surface adhered to the one surface of the bottom chassis 6 with the double-faced adhesive tape 13 on the alignment part 6d of the bottom chassis 6 with the reflector through holes 21a and the insertion holes 6e faced against each other. The reflector 21 is attached to the outer circumferential wall part 6b of the bottom chassis 6 at the outer circumferential edge with a connecting member such as a screw or an adhesive, for example. Since three LEDs 11 are mounted on each of the light source substrates 10, a total of four magnets 14 are placed on one surface of the reflector 21 as a whole, including a total of two among the LEDs 11 and 11 in the horizontal direction over all of the light source substrates 10, which are aligned in the horizontal direction.

The magnets 14 are bonded to magnet attachment parts, not shown, of the bottom chassis 6 through connecting member attachment holes, not shown, of the reflector 21 with connecting members 16 such as a screw. The attachment of the reflector 21 to the alignment part 6d of the bottom chassis 6 through the light source substrates 10 with the double-faced adhesive tape 13 pushes the light source substrates 10 against the bottom chassis 6. Furthermore, the magnets 14 placed on one surface of the reflector 21 magnetically attract the bottom chassis 6 formed by galvanizing a magnetically attractable metallic material, which pushes the light source substrates 10 against the bottom chassis 6.

Next, the optical stud members 24 are pushed into the insertion holes 6e with the attachment part 24b through the reflector through holes 21a of the reflector 21 from one surface side of the bottom chassis 6. When each of the attachment parts 24b of the optical stud members 24 passes through the corresponding insertion hole 6e, the diameter of the support medium 24f becomes smaller than that of the insertion hole 6e. After it passes through the insertion hole 6e, the diameter returns to a larger diameter than that of the insertion hole 6e because of the elasticity. Thus, the tip surface of the support medium 24f can be supported by the circumference on the other surface side of the insertion hole 6e. In this case, each of the optical stud members 24 is attached to the bottom chassis 6 with the tip surface of the support medium 24f supported by the circumference of the other surface side of the insertion hole 6e of the bottom chassis 6 and the bottom chassis defining part 24d abutted against one surface of the bottom chassis 6.

Next, the diffuser 22 already in combination with the optical function sheet laminate 23 on one surface is attached to the outer circumferential wall part 6b of the bottom chassis 6 by using the bracket member 22a with the other surface abutted against the tips of the optical stud members 24. In this case, the optical stud members 24 define the facing intervals between the diffuser 22 and the reflector 21 and the reflector 21 and the bottom chassis 6 with the tips of the optical stud members 24 in contact with and abutted against the other surface of the diffuser 22 at dots or narrower areas and with the reflector defining part 24c abutted against the one surface of the reflector 21. Thus, the parallelism among the main surfaces of the facing optical sheets can be maintained with high precision across the entire surfaces.

In the backlight unit 3 having the configuration above, each of the light source substrates 10 attached to one surface of the bottom chassis 6 is as thin as approximately 0.5 mm thick as a whole including a thickness of the base 10a of approximately 0.2 mm. Therefore, the light source substrates 10 have high flexibility. The light source substrates 10 with high flexibility are pushed against the bottom chassis 6 through the reflector 21 with the double-faced adhesive tape 13 and magnets 14, which are pushing members. Thus, if the light source substrates 10 and the bottom chassis 6 have different thermal expansion coefficients and therefore have different degrees of thermal expansion or if the bottom chassis 6 has a form having projections and depressions, for example, a gap is not formed between the light source substrates 10 and the bottom chassis 6, and the light source substrates 10 can be kept in intimate contact with the bottom chassis 6. Therefore, the heat generated from the LEDs 11 can be radiated to the bottom chassis 6 efficiently. As a result, the backlight unit 3 can prevent the decrease in luminous efficiency of a part of the LEDs 11 due to the increase in temperature of the partial LEDs 11 and can prevent the occurrence of variations in brightness and color.

In the backlight unit 3, the base 12a of the wiring substrate 12 electrically connecting the light source substrates 10 and 10 is a metal core substrate containing an aluminum material, for example, and is as thin as approximately 0.5 mm thick as a whole including a thickness of the base 12a of approximately 0.2 mm. Therefore, the wiring substrate 12 has high flexibility and high thermal conductivity and can electrically connect the light source substrates 10 and 10 easily. Furthermore, the heat caused by the LEDs 11 mounted on the light source substrates 10 can be radiated also from the wiring substrate 12.

In the backlight unit 3, since the base 12a of the wiring substrate 12 electrically connecting the light source substrates 10 and 10 is a metal core substrate formed of an aluminum material, for example, the discharge of the unnecessary radiation of current can be suppressed, and the electromagnetic wave resistant characteristics can be improved.

In the backlight unit 3, since the wiring substrate 12 connects the light source substrates 10 and 10 by soldering or ACF connection, problems such as the disconnection after the assembly do not occur easily, which can improve the reliability of the connection, compared with the electric connection through a harness, for example, as in the past.

Figure 9:
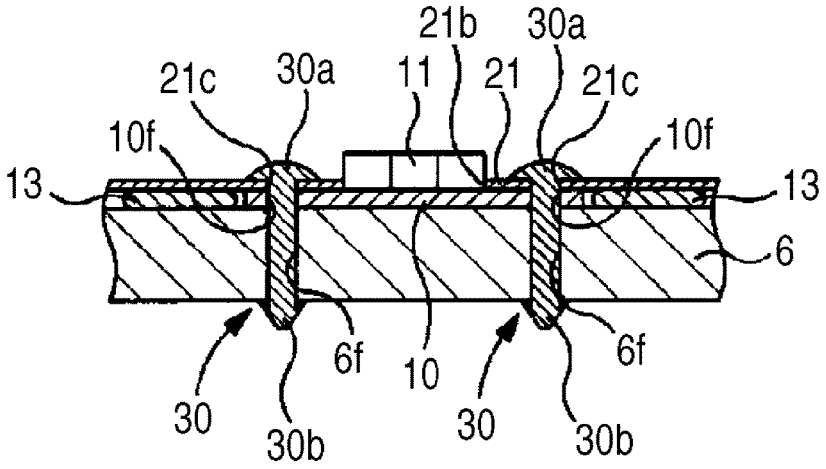
FIG. 9 is a longitudinal section view of an essential part showing a state that the light source substrates are pushed against the bottom chassis through the reflector by using the double-faced adhesive tape and connecting members.

The backlight unit 3 is not limited to the push of the light source substrates 10 against the bottom chassis 6 through the reflector 21 by the magnets 14. A connecting member, which is another pushing member instead of magnets, such as a connecting pin 30, may push the light source substrates 10 against the bottom chassis 6 through the reflector 21 as shown in FIG. 9. The backlight unit 3 hereinafter has a similar configuration as that in a case employing the magnets 14 except that each of the light source substrates 10 has insertion holes 10f through which the connecting pins 30 are inserted in the vicinity of the four corners, the bottom chassis 6 have connecting holes 6f through which the connecting pins 30 are inserted, which correspond to the insertion holes 10f of the light source substrates 10, and the reflector 21 has connecting member through holes 21c through which the connecting pins 30 are inserted, which correspond to the alignment positions of the insertion holes 10f of the light source substrates 10. The same reference numerals are given to the same components, and the descriptions will be omitted herein.

Each of the connecting pins 30 has a so-called clip shape and specifically has a pushing part 30a and an attachment part 30b. The pushing part 30a pushes one surface of the reflector 21, and the attachment part 30b provided continuously from the base end of the pushing part 30a and is latched with the other surface of the bottom chassis 6. The pushing part 30a that pushes one surface of the reflector 21 has a flange shape. The attachment part 30b provided continuously from the base end of the pushing part 30a has an axis part 30c to be inserted to the corresponding connecting holes 6f of the bottom chassis 6. The axis part 30c is integral with the pushing part 30a. A latch part 30d projects from the outer circumference of the base end of the axis part 30c. The latch part 30d has a tip end of a larger diameter than that of the connecting hole 6f and is latched with the circumference on the other surface side of the connecting hole 6f. The latch part 30d has elasticity, and when the tip end of a larger diameter than that of the connecting hole 6f is pushed radially, the diameter becomes smaller than that of the connecting hole 6f temporarily. Thus, the latch part 30d can be detached from the bottom chassis 6.

After the reflector 21 is attached to the bottom chassis 6 through the light source substrates 10 with the double-faced adhesive tape 13 on the bottom chassis 6, the attachment part 30b of each of the connecting pins 30 in a so-called clip shape having the configuration above is pushed into the corresponding connecting hole 6f from one surface side of the bottom chassis 6 through the corresponding connecting member through hole 21c.

When the attachment part 30b of each of the connecting pins 30 passes through the corresponding connecting hole 6f, the diameter of the latch part 30d becomes smaller than that of the connecting hole 6f. After it passes through the connecting hole 6f, the diameter returns to a larger diameter than that of the connecting hole 6f because of the elasticity. Thus, the tip surface of the latch part 30d can be latched with the circumference on the other surface side of the connecting hole 6e. Furthermore, the pushing parts 30a push one surface of the reflector 21 and bond the reflector 21 to the bottom chassis 6 through the light source substrates 10.

In this case, in each of the connecting pins 30, the tip surface of the latch part 30d is latched with the circumference on the other surface side of the corresponding connecting hole 6f of the bottom chassis 6, and the pushing part 30a pushes one surface of the reflector 21, whereby the light source substrates 10 are sandwiched between the reflector 21 and the bottom chassis 6. Thus, the light source substrates 10 are pushed against the bottom chassis 6 through the reflector 21.

In the backlight unit 3 having the configuration above, each of the light source substrates 10 attached to one surface of the bottom chassis 6 is thin and thus has high flexibility. The light source substrates 10 with high flexibility are pushed against the bottom chassis 6 through the reflector 21 with the double-faced adhesive tape 13 and connecting pins 30, which are pushing members. Thus, if the light source substrates 10 and the bottom chassis 6 have different thermal expansion coefficients and therefore have different degrees of thermal expansion or if the bottom chassis 6 has a form having projections and depressions, for example, a gap is not formed between the light source substrates 10 and the bottom chassis 6, and the light source substrates 10 can be kept in intimate contact with the bottom chassis 6. Therefore, the heat generated from the LEDs 11 can be radiated to the bottom chassis 6 efficiently. As a result, the backlight unit 3 can prevent the decrease in luminous efficiency of a part of the LEDs 11 due to the increase in temperature of the partial LEDs 11 and can prevent the occurrence of variations in brightness and color.

In the backlight unit 3, without limiting to the connecting pins 30 in a clip shape as described above, the reflector 21 may be bonded to the bottom chassis 6 through the light source substrates 10 by screwing with connecting members such as screws through the connecting holes 6f of the bottom chassis 6 functioning as screw holes, and the light source substrates 10 may be sandwiched between the reflector 21 and the bottom chassis 6 such that the light source substrates 10 can be pushed against the bottom chassis 6 through the reflector 21.

In the backlight unit 3 having the configuration above, each of the light source substrates 10 attached to the bottom chassis 6 is thin and thus has high flexibility. The light source substrates 10 with high flexibility are pushed against the bottom chassis 6 through the reflector 21 with the double-faced adhesive tape 13 and connecting members such as screws, which are pushing members. Thus, if the light source substrates 10 and the bottom chassis 6 have different thermal expansion coefficients and therefore have different degrees of thermal expansion or if the bottom chassis 6 has a form having projections and depressions, for example, a gap is not formed between the light source substrates 10 and the bottom chassis 6, and the light source substrates 10 can be kept in intimate contact with the bottom chassis 6. Therefore, the heat generated from the LEDs 11 can be radiated to the bottom chassis 6 efficiently. As a result, the backlight unit 3 can prevent the decrease in luminous efficiency of a part of the LEDs 11 due to the increase in temperature of the partial LEDs 11 and can prevent the occurrence of variations in brightness and color.

Figure 10:
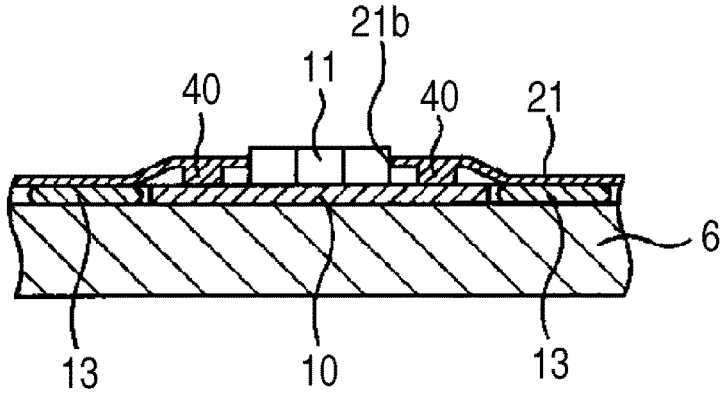
FIG. 10 is a longitudinal section view of an essential part showing a state that the light source substrates are pushed against the bottom chassis through the reflector by using the double-faced adhesive tape and pushing projections.

Furthermore, the backlight unit 3 is not limited to the push of the light source substrates 10 against the bottom chassis 6 through the reflector 21 by pushing members such as the magnets 14 and connecting members such as the connecting pins 30 and screws. Pushing projections 40, which are other pushing members, projecting from the other surface of the reflector 21 facing the light source substrates 10 toward the other surface side, as shown in FIG. 10, may push the light source substrates 10 against the bottom chassis 6.

A plurality of pushing projections 40 project at positions facing the light source substrates 10 on the other surface of the reflector 21 at predetermined intervals so as to push the entire light source substrates 10 against the bottom chassis 6. More specifically, a total of six pushing projections 40 project on the other surface of the reflector 21, including three at predetermined intervals facing the vicinity of one long side of the light source substrates 10 and three at predetermined intervals facing the vicinity of the other long side. If the reflector 21 is formed of a metallic material, for example, a plurality of pushing projections 40 folded toward the other surface side of the reflector 21 may be provided at predetermined intervals at positions facing the light source substrates 10 on the other surface of the reflector 21 such that the entire light source substrates 10 can be pushed against the bottom chassis 6. The attachment of the reflector 21 to one surface of the bottom chassis 6 through the light source substrates 10 with the double-faced adhesive tape 13 can push the light source substrates 10 through the pushing projections 40 on the other surface. The number and alignment positions of the pushing projections 40 are not limited thereto, but any number of pushing projections 40 may be provided at any positions since it is important here that the entire light source substrates 10 can be pushed against the bottom chassis 6. The number and alignment positions of the pushing projections 40 can be changed properly.

In the backlight unit 3 having the configuration above, each of the light source substrates 10 attached to the bottom chassis 6 is thin and thus has high flexibility. The light source substrates 10 with high flexibility are pushed against the bottom chassis 6 by the reflector 21, which is attached to the bottom chassis 6 through the light source substrates 10 with the double-faced adhesive tape 13, through the pushing projections 40, which are pushing members, on the other surface of the reflector 21. Thus, if the light source substrates 10 and the bottom chassis 6 have different thermal expansion coefficients and therefore have different degrees of thermal expansion or if the bottom chassis 6 has a form having projections and depressions, for example, a gap is not formed between the light source substrates 10 and the bottom chassis 6, and the light source substrates 10 can be kept in intimate contact with the bottom chassis 6. Therefore, the heat generated from the LEDs 11 can be radiated to the bottom chassis 6 efficiently. As a result, the backlight unit 3 can prevent the decrease in luminous efficiency of a part of the LEDs 11 due to the increase in temperature of the partial LEDs 11 and can prevent the occurrence of variations in brightness and color.

Figure 11:
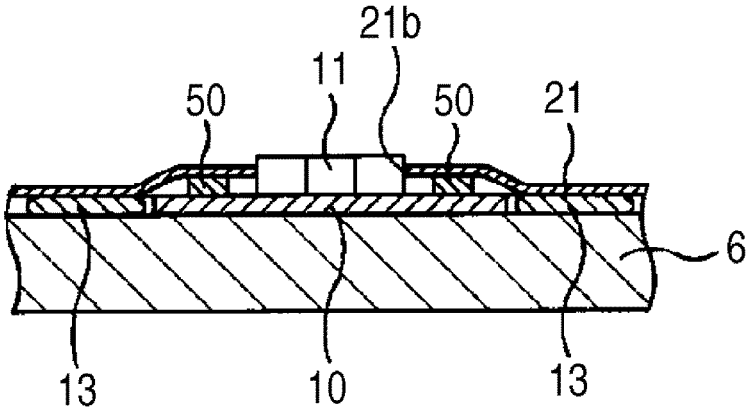
FIG. 11 is a longitudinal section view of an essential part showing a state that the light source substrates are pushed against the bottom chassis through the reflector by using the double-faced adhesive tape and spacers.

Furthermore, the backlight unit 3 is not limited to the push of the light source substrates 10 against the bottom chassis 6 through the reflector 21 by pushing members such as the magnets 14, connecting members such as the connecting pins 30 and screws and the pushing projections 40. Spacers 50, which are other pushing members, providing between the reflector 21 and the light source substrates 10, as shown in FIG. 11, may push the light source substrates 10 against the bottom chassis 6.

A plurality of spacers 50 are adhered onto one surface of each of the light source substrates 10, that is, onto each of the soldering resist layers 10d at predetermined intervals with an adhesive so that the entire light source substrates 10 can be pushed against the bottom chassis 6. More specifically, a total of six spacers 50 are adhered with an adhesive, for example, onto the soldering resist layer 10d of each of the light source substrates 10, including three at predetermined intervals in the vicinity of one long side of the light source substrate 10 and three at predetermined intervals in the vicinity of the other long side. The number and alignment positions of the spacers 50 are not limited thereto, but any number of spacers 50 are provided at any positions since it is important here that the entire light source substrates 10 can be pushed against the bottom chassis 6. The number and alignment positions of the spacers 50 can be changed properly.

The attachment of the reflector 21 to the bottom chassis 6 through the light source substrates 10 with the double-faced tape 13 can push the light source substrates 10 against the bottom chassis 6 through the spacers 50 adhered onto one surface of the light source substrates 10. The spacers 50 are not limited to provide on one surface of the light source substrates but may be adhered to positions facing the light source substrates 10 on the other surface of the bottom chassis 6 with an adhesive, for example.

In the backlight unit 3 having the configuration above, each of the light source substrates 10 attached to one surface of the bottom chassis 6 is thin and thus has high flexibility. The light source substrates 10 with high flexibility are pushed against the bottom chassis 6 by the reflector 21, which is attached to the bottom chassis 6 through the light source substrates 10 with the double-faced adhesive tape 13, through the spacers 50, which are pushing members provided between the reflector 21 and the light source substrates 10. Thus, if the light source substrates 10 and the bottom chassis 6 have different thermal expansion coefficients and therefore have different degrees of thermal expansion or if the bottom chassis 6 has a form having projections and depressions, for example, a gap is not formed between the light source substrates 10 and the bottom chassis 6, and the light source substrates 10 can be kept in intimate contact with the bottom chassis 6. Therefore, the heat generated from the LEDs 11 can be radiated to the bottom chassis 6 efficiently. As a result, the backlight unit 3 can prevent the decrease in luminous efficiency of a part of the LEDs 11 due to the increase in temperature of the partial LEDs 11 and can prevent the occurrence of variations in brightness and color.

In the backlight unit 3, a combination of a plurality of pushing members such as the magnets 14, connecting members such as connecting pins 30 and screws, pushing projections 40 and spacers 50 may be used to push the light source substrates 10 with high flexibility against the bottom chassis 6 through the reflector 21.

Figure 12:
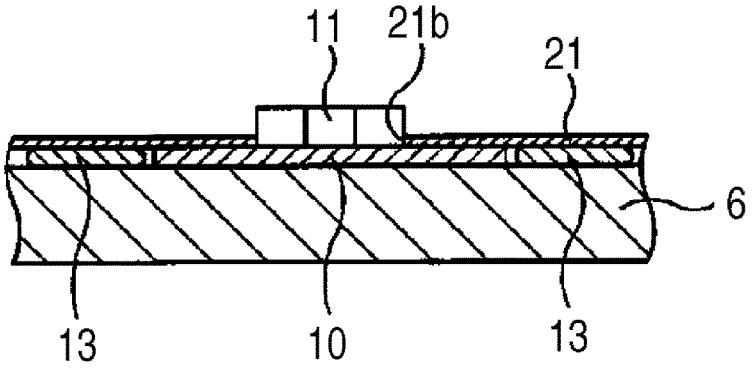
FIG. 12 is a longitudinal section view of an essential part showing a state that the light source substrates are pushed against the bottom chassis through the reflector by using the double-faced adhesive tape.

It is important in the backlight unit 3 that the push of the light source substrates 10 with high flexibility against the bottom chassis 6 through the reflector 21 can keep the light source substrates 10 in intimate contact with the bottom chassis 6 without the formation of any gaps between the light source substrates 10 and the bottom chassis 6. Therefore, the reflector 21 attached to the bottom chassis 6 through the light source substrates 10 with the double-faced adhesive tape 13 may push the light source substrates 10 with high flexibility against the bottom chassis 6, as shown in FIG. 12, without using pushing members such as the magnets 14, connecting members such as the connecting pins 30 and screws, the pushing projections 40 and spacer 50 as described above.

In the backlight unit 3, the base 10a of each of the light source substrates 10 is not limited to a metal core substrate formed of an aluminum material but may be any metal core substrate formed of other metallic material with flexibility.

In the backlight unit 3, each of the light source substrates 10 is not limited to a metal core substrate but may be any substrate with flexibility such as a glass epoxy substrate.

In the backlight unit 3, it is not limited that the light source substrates 10 have flexibility. Each of the light source substrates 10 may be any substrate without flexibility such as a thick metal core substrate and glass epoxy substrate.

In the backlight unit 3, it is not limited that the light source substrates 10 and 10 aligned in the longitudinal direction on one surface of the bottom chassis 6 are electrically connected by the wiring substrate 12. The light source substrates 10 and 10 may be electrically connected by a harness, for example.

Figure 13:
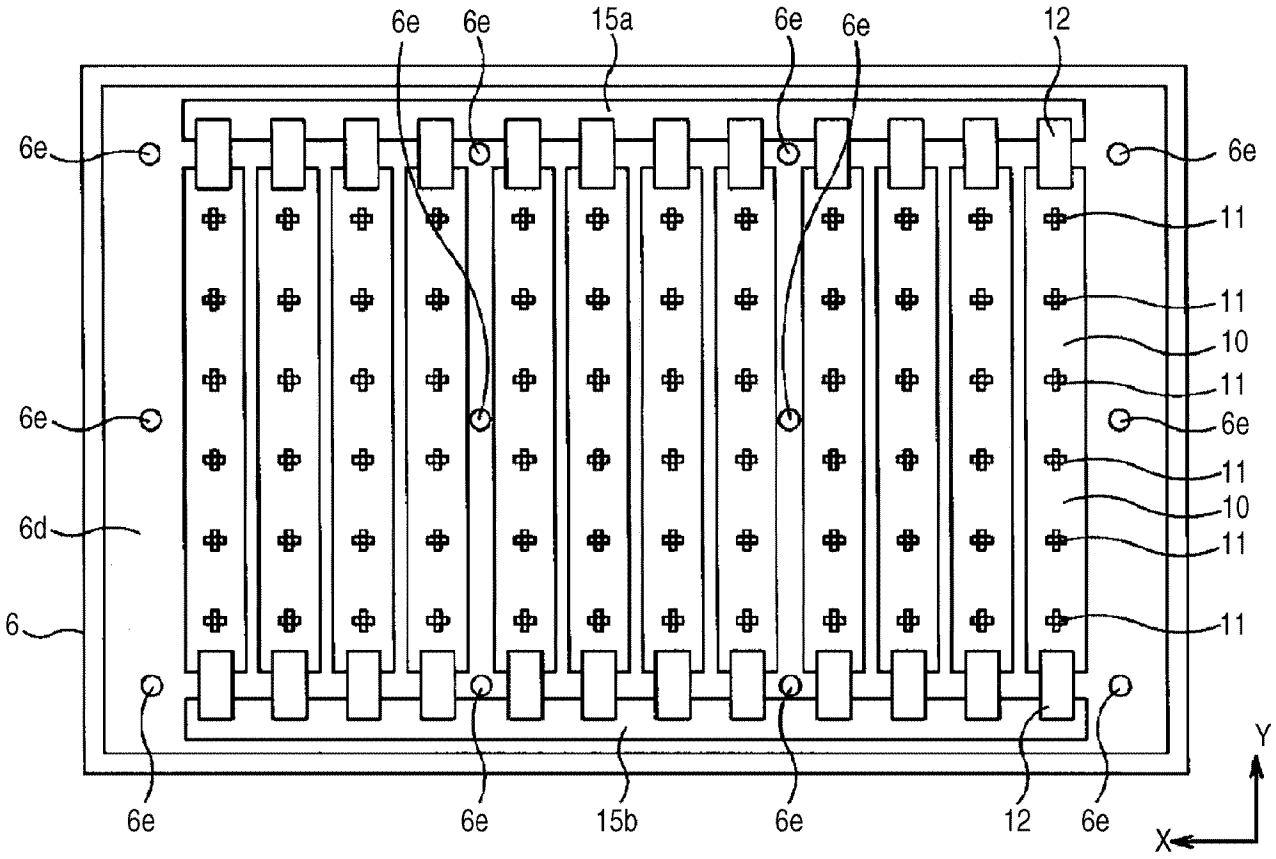
FIG. 13 is a plan view of the bottom chassis to which light source substrates having an equal length to that of the short side of the main surface are directly mounted.

In the backlight unit 3, as shown in FIG. 13, a plurality of light source substrates 10, each of which has a substantially equal length as that of the short side of the main surface part 6a, may be directly aligned on the bottom chassis 6 at predetermined intervals in the direction of the long side of the bottom chassis 6, that is, the arrow-X direction in FIG. 13. In the light source substrates 10, the wiring substrate 12 is used to electrically connect the light source connection parts on one side to the LED drive circuit substrate 15a on one side on the bottom chassis 6 by soldering or ACF connection and the other light source connection parts to the LED drive circuit substrate 15b on the other side on the bottom chassis 6 by soldering or ACF connection, for example. The backlight unit 3 having the configuration above can turn on and off each of the LEDs 11 or each group of the plurality of LEDs 11 and can control the amount of emitted light through the LED drive circuit substrates 15a and 15b, which can mount the display with brightness differentiated among sections.

It should be understood by those skilled in the art that various modifications, combinations, sub-combinations and alterations may occur depending on design requirements and other factors insofar as they are within the scope of the appended claims or the equivalents thereof.

What is claimed is:

1. A backlight device that illuminates a transmissive liquid crystal panel from [the] *a* back side *of the liquid crystal panel*, the backlight device comprising:

a plurality of light source substrates on *each of* which a plurality of light emitting devices that [irradiate] *radiate* illumination light are mounted;

a bottom chassis having [one] *a main* surface [to] *on* which the plurality of light source substrates are [attached] *directly mounted*;

a reflector having openings corresponding to the *plurality of* light emitting devices mounted on the *plurality of* light source substrates [attached to] *directly mounted on* the bottom chassis, the *plurality of* light emitting devices being exposed [to one surface side] through the openings, the reflector reflecting the illumination light irradiated from the *plurality of* light emitting devices;

a diffuser facing [the] one surface side of the reflector [through a predetermined] *with a* facing interval [from the reflector and internally] *therebetween, the diffuser* diffusing the illumination light [incident from] *reflected by* the reflector; and an optical function sheet laminate [combined with the diffuser] on one surface side [thereof,] *of the diffuser and* containing a stack of a plurality of optical function sheets [and guiding] *that guide* the illumination light *from the diffuser* to the transmissive liquid crystal panel, wherein, the reflector is directly attached to the [one] *main* surface of the bottom chassis, [and]

*each light source substrate has a plate shape and a wiring pattern on an insulating layer,*

[the] *each* light source [substrates are] *substrate has flexibility and is* pushed [against] *into direct intimate contact with the main surface of* the bottom chassis *to be in accordance with a form of the bottom chassis, and*

*the reflector is bent such that a part of the reflector is at an oblique angle with respect to the main surface of the bottom chassis.*

2. The backlight device according to claim 1, wherein the *plurality of* light source substrates are metal core substrates.

3. The backlight device according to claim 2, wherein the [a] plurality of light source substrates are connected through a wiring member[; and the wiring member is a metal core substrate].

4. The backlight device according to claim 3, wherein the reflector is adhered to [one] *the main* surface of the bottom chassis with an adhesive tape on the [one] *main* surface of the bottom chassis.

5. The backlight device according to claim 4, wherein the reflector further pushes the *plurality of* light source substrates against the *main surface of the* bottom chassis [through] *via* a pushing member.

6. The backlight device according to claim 5, wherein:

the pushing member is a magnet; and the magnet *is* placed [one] *on a* surface of the reflector *and* magnetically attracts the bottom chassis through the *plurality of* light source substrates so that the reflector can push the *plurality of* light source substrates against the *main surface of the* bottom chassis.

7. The backlight device according to claim 5, wherein:

the pushing member [is a connecting member] *includes connecting members*; and the connecting [member connects] *members connect* to the bottom chassis through the *plurality of* light source substrates so that the reflector can push the *plurality of* light source substrates against the *main surface of the* bottom chassis.

[8. A liquid crystal display apparatus comprising:

a transmissive liquid crystal panel; and a backlight device that illuminates the transmissive liquid crystal panel from the back side, the backlight device having a plurality of light source substrates on which a plurality of light emitting devices that irradiate illumination light are mounted;

a bottom chassis having one surface to which the plurality of light source substrates are attached;

a reflector having openings corresponding to the light emitting devices mounted on the light source substrates attached to the bottom chassis, the light emitting devices being exposed to the other surface side through the openings, the reflector reflecting the illumination light irradiated from the light emitting devices;

a diffuser facing one surface side of the reflector through a predetermined facing interval from the reflector and internally diffusing the illumination light incident from the reflector; and an optical function sheet laminate combined with the diffuser on the one surface side thereof, containing a stack of a plurality of optical function sheets and guiding the illumination light to the transmissive liquid crystal panel, wherein the reflector is directly attached to one surface of the bottom chassis, and the light source substrates are pushed against the bottom chassis.]

[9. The liquid crystal display apparatus according to claim 8, wherein the light source substrates are metal core substrates.]

[10. The liquid crystal display apparatus according to claim 9, wherein the plurality of light source substrates are connected through a wiring member; and the wiring member is a metal core substrate.]

[11. The liquid crystal display apparatus according to claim 10, wherein the reflector is adhered to one surface of the bottom chassis with an adhesive tape on the one surface of the bottom chassis.]

[12. The liquid crystal display apparatus according to claim 11, wherein the reflector further pushes the light source substrates against the bottom chassis through a pushing member.]

[13. The liquid crystal display apparatus according to claim 12, wherein:

the pushing member is a magnet; and the magnet placed one surface of the reflector magnetically attracts the bottom chassis through the light source substrates so that the reflector can push the light source substrates against the bottom chassis.]

[14. The liquid crystal display apparatus according to claim 12, wherein:

the pushing member is a connecting member; and the connecting member connects to the bottom chassis through the light source substrates so that the reflector can push the light source substrates against the bottom chassis.]

*15. The light source device of claim 1, wherein the surface of the bottom chassis has projections, the projections being in contact with the reflector.*

*16. The backlight device according to claim 1, wherein the reflector further pushes the plurality of light source substrates against the main surface of the bottom chassis by means of screws.*

*17. The backlight device according to claim 1, wherein the reflector is directly attached to the bottom chassis by means of screws.*

*18. A liquid crystal device comprising the backlight device and the transmissive liquid crystal panel according to claim 1.*

*19. A liquid crystal display apparatus comprising:*

*(a) a liquid crystal panel; and*

*(b) a backlight device, the backlight device including*

*(1) at least one light source substrate having a plurality of light sources thereon,*

*(2) a bottom chassis having a main surface facing the liquid crystal panel and on which the at least one light source substrate is directly mounted,*

*(3) a reflector having a first surface facing the liquid crystal panel and a second surface facing the bottom chassis, the reflector having at least an opening, the opening aligning with one of the plurality of light sources,*

*wherein,*

*the reflector is attached to the bottom chassis,*

*the at least one light source substrate has flexibility and is in direct contact with the main surface of the bottom chassis,*

*the reflector is bent such that a part of the reflector is at an oblique angle with respect to the main surface of the bottom chassis, and*

*the reflector is secured to the bottom chassis by means of a tape with adhesive.*

*20. The liquid crystal display apparatus of claim 19, further comprising a diffuser facing the first surface of the reflector with a facing interval therebetween.*

*21. The liquid crystal display apparatus of claim 19, wherein:*

*the bottom chassis has a wall that extends from the main surface of the bottom chassis, and*

*an outer circumferential edge part of the reflector is attached to the wall.*

*22. The liquid crystal display apparatus of claim 20, further comprising:*

*a plurality of optical function sheets between the diffuser and the liquid crystal panel, the plurality of optical function sheets being effective to guide light from the plurality of light sources toward the liquid crystal panel,*

*wherein,*

*the plurality of optical function sheets are stacked to form a laminate and guide illumination light from the diffuser.*

*23. A liquid crystal display apparatus comprising:*

*(a) a liquid crystal panel; and*

*(b) a backlight device, the backlight device including*

*(1) at least one light source substrate having a plurality of light sources thereon,*

*(2) a bottom chassis having a main surface facing the liquid crystal panel and on which the at least one light source substrate is directly mounted,*

*(3) a reflector having a first surface facing the liquid crystal panel and a second surface facing the bottom chassis, the reflector having at least an opening, the opening aligning with one of the plurality of light sources,*

*wherein,*

*the reflector is attached to the bottom chassis,*

*the at least one light source substrate has flexibility and is in direct contact with the main surface of the bottom chassis, and*

*the reflector is bent such that a part of the reflector is at an oblique angle with respect to the main surface of the bottom chassis, and*

*the reflector has a magnet on the first surface of the reflector, the magnet being configured to magnetically attract the bottom chassis through the at least one light source substrate.*

*24. A light source device, comprising:*

*(a) at least one light source substrate with a plurality of light sources thereon,*

*(b) a bottom chassis with a surface on which the at least one light source substrate is directly mounted,*

*(c) a reflector with a first surface facing away from the bottom chassis and a second surface facing the bottom chassis, the reflector having at least an opening, the opening corresponding to one of the plurality of light sources,*

*wherein,*

*the reflector is mounted on the bottom chassis,*

*the at least one light source substrate has flexibility and is held in direct contact with the main surface of the bottom chassis,*

*the reflector is bent such that a part of the reflector is at an oblique angle with respect to the main surface of the bottom chassis, and*

*a magnet on the first surface of the reflector, the magnet being configured to magnetically attract the bottom chassis through the at least one light source substrate.*

*25. The light source device of claim 24, wherein:*

*the bottom chassis has a wall that extends from the main surface of the bottom chassis, and*

*an outer circumferential edge part of the reflector is attached to the wall.*

*26. The light source device of claim 24, wherein the at least one light source substrate is held in direct contact with the main surface of the bottom chassis by the reflector.*

*27. The light source device of claim 25, wherein a vertex of the oblique angle of the reflector is spaced from the wall of the bottom chassis.*

* * * * *